US007682247B2

(12) United States Patent
Nelson et al.

(10) Patent No.: US 7,682,247 B2
(45) Date of Patent: Mar. 23, 2010

(54) METHOD OF USING A RULE BASED SCRIPT TO DESCRIBE GAMING MACHINE PAYOUT

(75) Inventors: Dwayne R. Nelson, Las Vegas, NV (US); David M. Oles, Henderson, NV (US); Steven G. LeMay, Reno, NV (US); Bayard Webb, Sparks, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/510,235

(22) Filed: Aug. 24, 2006

(65) Prior Publication Data

US 2007/0021181 A1 Jan. 25, 2007

Related U.S. Application Data

(62) Division of application No. 10/243,614, filed on Sep. 13, 2002, now Pat. No. 7,104,889.

(51) Int. Cl.

| | |
|---|---|
| ***A63F 9/24*** | (2006.01) |
| ***A63F 13/02*** | (2006.01) |
| ***A63F 13/08*** | (2006.01) |
| ***A63F 13/12*** | (2006.01) |
| ***G06F 9/30*** | (2006.01) |
| ***G06F 9/44*** | (2006.01) |
| ***G06F 9/45*** | (2006.01) |
| ***G06F 9/455*** | (2006.01) |
| ***G06F 7/58*** | (2006.01) |
| *A63F 5/04* | (2006.01) |
| *G07F 17/34* | (2006.01) |

(52) U.S. Cl. ............................ 463/25; 463/21; 463/22; 463/29; 463/43

(58) Field of Classification Search .................. 463/16, 463/20, 21, 22, 29, 25, 43
See application file for complete search history.

(56) References Cited

U.S. PATENT DOCUMENTS 5,274,074 A 12/1993 Tang et al.

(Continued)

FOREIGN PATENT DOCUMENTS

EP 1 004 970 A2 * 5/2000

(Continued)

OTHER PUBLICATIONS

Nevada Gaming Regulation 14, downloaded from www.gaming.nv.gov, Apr. 15, 2007.*

(Continued)

*Primary Examiner*—Peter DungBa Vo
*Assistant Examiner*—Matthew D. Hoel
(74) *Attorney, Agent, or Firm*—Weaver Austin Villeneuve & Sampson LLP

(57) ABSTRACT

A gaming machine's payout is controlled by payout data. In one embodiment the payout data is written in a high level format, such as in a format that is readable by an individual to allow the identification of specific payout parameters in the payout data. In one embodiment the payout data is stored on mass media or removable media located in the gaming machine that makes the payout data easily accessible and less expensive than media used in the prior art. As a result, the payout data may be efficiently modified, updated, or distributed.

9 Claims, 6 Drawing Sheets

U.S. PATENT DOCUMENTS

| | | | | |
|---|---|---|---|---|
| 5,324,035 | A * | 6/1994 | Morris et al. | 463/42 |
| 5,326,104 | A | 7/1994 | Pease et al. | |
| 5,542,669 | A | 8/1996 | Charron et al. | |
| 5,611,730 | A * | 3/1997 | Weiss | 463/20 |
| 5,643,086 | A * | 7/1997 | Alcorn et al. | 463/29 |
| 5,655,961 | A | 8/1997 | Acres et al. | |
| 5,707,286 | A * | 1/1998 | Carlson | 463/16 |
| 5,759,102 | A * | 6/1998 | Pease et al. | 463/42 |
| 5,820,459 | A | 10/1998 | Acres et al. | |
| 5,871,398 | A * | 2/1999 | Schneier et al. | 463/16 |
| 5,967,893 | A | 10/1999 | Lawrence et al. | |
| 6,071,190 | A * | 6/2000 | Weiss et al. | 463/25 |
| 6,106,396 | A * | 8/2000 | Alcorn et al. | 463/29 |
| 6,117,009 | A * | 9/2000 | Yoseloff | 463/20 |
| 6,135,887 | A * | 10/2000 | Pease et al. | 463/42 |
| 6,149,522 | A * | 11/2000 | Alcorn et al. | 463/29 |
| 6,151,609 | A * | 11/2000 | Truong | 715/505 |
| 6,159,096 | A * | 12/2000 | Yoseloff | 463/20 |
| 6,210,274 | B1 * | 4/2001 | Carlson | 463/16 |
| 6,219,836 | B1 * | 4/2001 | Wells et al. | 717/178 |
| 6,264,561 | B1 | 7/2001 | Saffari et al. | |
| 6,298,475 | B1 | 10/2001 | Alcorn | |
| 6,302,795 | B1 * | 10/2001 | Ito | 463/29 |
| 6,315,663 | B1 | 11/2001 | Sakamoto | |
| 6,327,702 | B1 * | 12/2001 | Sauntry et al. | 717/118 |
| 6,364,769 | B1 * | 4/2002 | Weiss et al. | 463/29 |
| 6,428,413 | B1 * | 8/2002 | Carlson | 463/16 |
| 6,471,588 | B2 | 10/2002 | Sakamoto | |
| 6,565,434 | B1 | 5/2003 | Acres | |
| 6,569,017 | B2 * | 5/2003 | Enzminger et al. | 463/19 |
| 6,620,047 | B1 * | 9/2003 | Alcorn et al. | 463/37 |
| 6,645,077 | B2 * | 11/2003 | Rowe | 463/42 |
| 6,682,423 | B2 | 1/2004 | Brosnan et al. | |
| 6,749,510 | B2 | 6/2004 | Giobbi | |
| 6,776,715 | B2 | 8/2004 | Price | |
| 6,802,778 | B1 | 10/2004 | LeMay et al. | |
| 6,824,465 | B2 * | 11/2004 | Luciano, Jr. | 463/18 |
| 6,866,581 | B2 * | 3/2005 | Martinek et al. | 463/16 |
| 6,898,788 | B2 | 5/2005 | Kosaka et al. | |
| 6,935,946 | B2 * | 8/2005 | Yoseloff et al. | 463/16 |
| 6,962,530 | B2 * | 11/2005 | Jackson | 463/29 |
| 6,981,150 | B2 * | 12/2005 | Little et al. | 713/191 |
| 6,986,055 | B2 * | 1/2006 | Carlson | 713/300 |
| 7,043,641 | B1 * | 5/2006 | Martinek et al. | 713/187 |
| 7,063,615 | B2 * | 6/2006 | Alcorn et al. | 463/1 |
| 7,104,889 | B2 | 9/2006 | Nelson et al. | |
| 7,116,782 | B2 * | 10/2006 | Jackson et al. | 380/251 |
| 2001/0041611 | A1 | 11/2001 | Sakamoto | |
| 2001/0044339 | A1 * | 11/2001 | Cordero et al. | 463/42 |
| 2002/0039917 | A1 * | 4/2002 | Armstrong et al. | 463/16 |
| 2002/0100028 | A1 | 7/2002 | Kosaka et al. | |
| 2002/0128065 | A1 * | 9/2002 | Chung et al. | 463/42 |
| 2003/0064805 | A1 * | 4/2003 | Wells | 463/39 |
| 2003/0064808 | A1 * | 4/2003 | Hecht et al. | 463/42 |
| 2004/0235562 | A1 * | 11/2004 | Kiely et al. | 463/29 |

FOREIGN PATENT DOCUMENTS

| | | | | |
|---|---|---|---|---|
| WO | WO 03/045519 | A1 * | 6/2003 | |

OTHER PUBLICATIONS

Nevada Gaming Regulation 14, Standard 1.050.*

"The Silicon Gaming Odyssey Slot Machine," by Adam Levinthal and Michael Barnett, IEEE Xplore database, 1063-6390/97, © 1997 IEEE, pp. 296-301.*

KSR v. Teleflex (2007).*

"Creating One Industry Standard for Manufacturers of Electronic Games of Chance," North American Gaming Regulators Association, Seattle, WA, May 23, 2000.*

Nevada Gaming Regulation 3.010, downloaded from www.gaming.nv.gov, Nov. 18, 2008.*

"MADSS: A Multi-Agent Based Distributed Scripting System," by Lin, et al., Aug. 2002, 0730-3157/02, downloaded from IEEE Xplore database, ieeexplore.ieee.org on Apr. 20, 2009.*

North American Gaming Regulators Association, Creating One Industry Standard for Manufacturers of Electronic Games of Chance, GAMMA C-Link, presented May 23, 2000.

IBM Technical Disclosure Bulletin, "Dynamically Configurable User Interface for the Manipulation of Data Objects," Mar. 1994, pp. 23-30.

IBM Technical Disclosure Bulletin, "System Supplied Data Integrity," Dec. 1982, pp. 3718-3721.

International Search Report mailed Jan. 22, 2004 from International Application No. PCT/US03/28746, including Notification of Transmittal of Int'l Search Report. 5 pages.

Notice of Allowance and Allowability mailed May 3, 2006 from U.S. Appl. No. 10/243,614. 4 pages.

U.S. Office Action mailed Oct. 25, 2005 from U.S. Appl. No. 10/243,614. 10 pages.

U.S. Advisory Action mailed Jun. 3, 2005 from U.S. Appl. No. 10/243,614. 3 pages.

U.S. Office Action mailed Feb. 7, 2005 from U.S. Appl. No. 10/243,614. 11 pages.

U.S. Office Action mailed Sep. 8, 2004 from U.S. Appl. No. 10/243,614. 8 pages.

* cited by examiner 404 408 412

420

| Random Number Generator {1, 2, 3, ....1000} | Outcomes {7R, 7W, 7B, Ch, DB, TR, 1B, 2B, 3B, -} | Payout {x, 2x, 3x, 10x, 100x, 200x, 1000x} |
|---|---|---|
| 1 | (TR, TR, TR) | BETx27,000 |
| 2 | (TR, TR, DB) | BETx18,000 |
| 3 | (TR, DB, TR) | BETx18,000 |
| 4 | (DB, TR, TR) | BETx18,000 |
| 5 | (TR, DB, DB) | BETx12,000 |
| 6 | (DB, TR, DB) | BETx12,000 |
| 7 | (DB, DB, TR) | BETx12,000 |
| 8 | (7R,TR, TR) | BETx9,000 |
| 9 | (TR, 7R, TR) | BETx9,000 |
| 10 | (TR, TR, 7R) | BETx9,000 |
| 11 | (DB, DB, DB) | BETx8,000 |
| 12 | (7R, DB, TR) | BETx6,000 |
| 13 | (7R, TR, DB) | BETx6,000 |
| 14 | (7R, DB, DB) | BETx4,000 |
| 15 | (7R, 7W, 7B) | BETx1,000 |
| . | . | . |
| . | . | . |
| . | . | . |
| . | . | . |
| . | . | . |
| . | . | . |
| | | |
| | | |
| | | |
| | | |
| | | |
| | | |
| | | |
| . | . | . |
| . | . | . |
| . | . | . |
| . | . | . |
| 999 | (-, -, Ch) | BETx2 |
| 1000 | (-, -, -) | 0 |

400

Fig. 4

METHOD OF USING A RULE BASED SCRIPT TO DESCRIBE GAMING MACHINE PAYOUT

RELATED APPLICATION DATA

The present application claims priority under U.S.C. 120 and is a divisional of U.S. patent application Ser. No. 10/243,614 titled "METHOD OF USING A RULE BASED SCRIPT TO DESCRIBE GAMING MACHINE PAYOUT" filed on Sep. 13, 2002 now U.S. Pat. No. 7,104,889 which is incorporated herein by reference in its entirety and for all purposes.

FIELD OF THE INVENTION

The present invention relates to gaming systems and in particular to an improved method and apparatus for creating and managing game control data.

BACKGROUND OF THE INVENTION

A key advancement in gaming has become the use of microprocessors in gaming machines. The use of more powerful and more affordable electronic technology has allowed for significant advances in the evolution of attractive, stimulating, and more interactive gaming machines. For example, the introduction of the multi-game machine has made switching between different games with varying challenge levels quite easy and convenient. As a result of the variety of games that are playable within a single gaming machine, the need for a player to search the floor for an alternative is reduced, allowing the player to continue play without interruption.

Switching between different games within a gaming machine requires that game control data associated with a game be used for that game. One such game control data is a payout table. The payout table provides the payout, such as a payout multiplier, associated with a particular outcome or event. For example, in a 3 reel slot machine game, an outcome displayed to the player may be the sequence (Cherry, Cherry, blank). In this instance, the payout multiplier may be 4 times the amount deposited into the slot machine prior to a round of play. In other instances, the payout may be a fixed amount other than a multiplier. For example, a player may win a specific amount of money if the slot machine generates a particular outcome. Hence, there is a corresponding payout associated with all the possible outcomes of a particular game played on the gaming machine.

The possible outcomes and payout factors are stored as payout data in the gaming machine. Payout data comprises a mapping of a set of outcomes in a particular game to a set of payout multipliers. The set of outcomes is predetermined and stored in the payout data that resides in the gaming machine. A particular outcome or event occurs by way of a number generated from a random number generator within the gaming machine. The monetary payout is determined by the payout multiplier and the wager made in any round of play. There are times when the payout data needs to be changed to reflect different payouts. Payouts can be changed quite frequently based on a number of different factors. Day of the week, time of day, changes in game rules, seasonal traffic, and location of a gaming machine are all factors that may necessitate a change in the payout from the perspective of the gaming machine's operator. In addition, the operator of the machine may simply want to review the payout rates as part of an audit.

However, there are many drawbacks associated with modifying the prior art payout data. One such drawback arises as a result of the media on which the payout tables are stored. In prior art systems, the payout tables were stored on integrated circuits known as programmable read only memory (PROM). PROMs are integrated circuit memory devices in which data is written once using a PROM programmer or "PROM burner". A type of PROM that is capable of erasing the data stored in memory is called an electrically erasable PROM (EEPROM). EEPROMs can be erased by exposing the EEPROM to ultraviolet light and then re-programming them with the "PROM burner". Current methods require a technician to manually remove the PROM (or EEPROM) from the gaming machine and replace the payout data by replacing the PROM or by re-programming the EEPROM. The removal procedure is time consuming because it is difficult to extract these memory devices from the gaming machine. Indeed, a special tool is used to cautiously extract the memory device which requires skill on the part of the technician. Because a change of payout table requires either a new PROM or the re-programming of the EEPROM, the servicing cost can be significant for a property with 1000 machines as found in some casinos.

An additional drawback in the removal and installation process is that the PROMs are situated proximal to other electronic devices, and as a result, static discharge may damage the new PROM and other surrounding static electrically sensitive devices during its removal. The installer must exercise caution, elsewise such electrical damage can be very costly to the casino or proprietor.

A drawback in current gaming machines is associated with compiling new payout data on a gaming machine. When new payout data is introduced in a gaming machine an associated evaluation code must be provided in order to compile the new payout data. In many instances, the evaluation code may not be compatible with the new payout data. As a result, new code must be programmed to properly evaluate the new payout data, requiring additional labor to program and debug the code. The process of changing payout data may be tedious and complex.

Other drawbacks include an interruption in game play during the PROM replacement process and a visible unattractiveness when the machine is open during the PROM removal procedure. These are all costs which reduce the profitability for the owner of the gaming machine. Over time, customers may migrate to other casinos where such occurrences do not disrupt game play.

Yet another drawback of the prior art procedure for changing the data payout stored on the PROM is that it is tedious. The current method requires a number of steps to create a new payout data PROM. As a consequence, game manufacturers maintain an inventory of these memory devices that contain different payout data. The unit cost of each additional PROM is an incremental cost to the casino owner or game manufacturer. In addition, there are inventory costs associated with these additional parts.

Still another drawback is that the PROMs are of limited capacity and are considerably more expensive than other forms of storage media. As a result, the amount of payout data that can be stored in such PROMs may be limited, which restricts the number of games that can be provided at a single gaming machine.

Another drawback is that the payout data, when stored on a PROM, is provided in an undesirable format for viewing by an individual such as a technician or programmer. The payout data on the PROM is stored as machine language that is unreadable to an individual; however, it is this machine language code, stored on the PROM, that is used by the gaming machine's microprocessor.

Finally, once the code is resident in PROM, the information is not easily accessible by an individual. Reading the data on the PROM requires removing the PROM and inserting it into a programming or reading device for the PROM. This is not a simple task.

Hence, there exists a need for an improved method and apparatus for the creation, storage, and modification of gaming machine payout data.

SUMMARY OF THE INVENTION

In one embodiment the invention comprises a method and apparatus for representing payout data and storing payout data to overcome the drawbacks of the prior art. In one embodiment the payout data is stored in a high level language capable of being read or understood by a human. In one embodiment the payout data is configured as a software program and in another embodiment the payout data is a data file. It is further contemplated that the payout data may be stored on a mass media or a removable media of the gaming machine. As a result of storage in a mass or removable media, the payout data may be easily replaced or updated.

In one embodiment a system is provided for modifying payout data stored on a gaming machine. This embodiment includes a gaming machine network and a gaming machine configured to offer a wagering event and to communicate over the gaming machine network. The payout of the wagering event is based on first payout data stored on the gaming machine. Also included is a network host configured to store second payout data and to communicate with the gaming machine over the gaming machine network. The host may transmit the second payout data to the gaming machine to thereby change the payout of a wagering event offered on the gaming machine.

It is further contemplated that transmitting the second payout data may comprise transferring second payout data through a wireless communication network to the gaming machine. The gaming machine may include a hard disk drive and the first payout data may be stored on the hard disk drive. In one embodiment the network host is configured to transfer the second payout data to the hard disk drive to thereby overwrite the first payout data with the second payout data. It is contemplated that the payout data may be configured as software code or the payout data may be configured as a data file.

In another embodiment a gaming machine is configured to offer a wagering event to a player and the payout of the wagering event is determined by payout data. The gaming machine comprising a media configured to store said payout data wherein the media is selected from the group of media consisting of hard disk drive, flash memory, CD ROM, DVD ROM, or any other type of memory. Also included in the gaming machine is a processor configured to access the payout data on the media, and process the payout data to determine a payout resulting from a wagering event. The gaming machine may further include user interface capable of receiving commands from a player during the wagering event and a display capable of providing visual information regarding the result of the wagering event to the player.

In one embodiment the gaming machine further includes a network interface configured to communicate over a gaming network to receive modified payout data. In one embodiment the payout data is configured as a high level language. The gaming machine may further include an input/output interface configure to connect to a portable computing device to receive modified payout data.

A method may be provided for determining a payout of a gaming machine during a wagering event based on payout data stored in the gaming machine's mass media. The method may comprise accessing payout data stored on a mass media, generating a random number with a random number generator, and mapping the random number to one of two or more outcomes contained in the payout data. Thereafter, mapping the outcome to a payout. In one variation the generating and mapping is performed by a processor. The mapping may be performed by an interpreter program.

In another embodiment a method of determining a payout for a wagering event occurring on a gaming machine based on payout data stored in the gaming machine's mass media is provided and comprises accessing the payout data stored on the mass media, generating a random number with a random number generator, providing the random number to a processor configured to execute the payout data, and executing the payout data utilizing the random number to generate a payout. In one embodiment the mass media comprises a hard disk drive. It is contemplated that the payout data comprises software code which may be edited using a text editor. In one embodiment the method further includes interpreting the payout data with an interpreter program prior to executing the payout data.

In one embodiment a method for editing gaming machine payout data is provided that comprises executing a text editing software program and accessing a payout data file stored on a media using the text editing software program. Thereafter, viewing the payout data file and modifying the payout data using the text editing software program based on the viewing. In one embodiment the payout data is a data file. Modifying may comprise changing the payout associated with a random number and accessing may comprise accessing payout data located on a remote gaming machine over a communication network.

In one embodiment a method is presented for representing payout data for manipulation by a gaming machine technician comprising the steps of creating software code containing the payout data in a format that is comprehensible by a gaming machine technician, displaying the software code on a display, editing the software code with an input device to effectuate a change of the payout data to thereby create modified software code, and storing the modified software code on a mass media. It is contemplated that the format comprises a high level language and the mass media may be located at a remote location.

BRIEF DESCRIPTION OF THE DRAWINGS

FIG. 4 illustrates an exemplary gaming machine payout table configured in accordance with the invention.

DETAILED DESCRIPTION OF THE INVENTION

Figure 1:
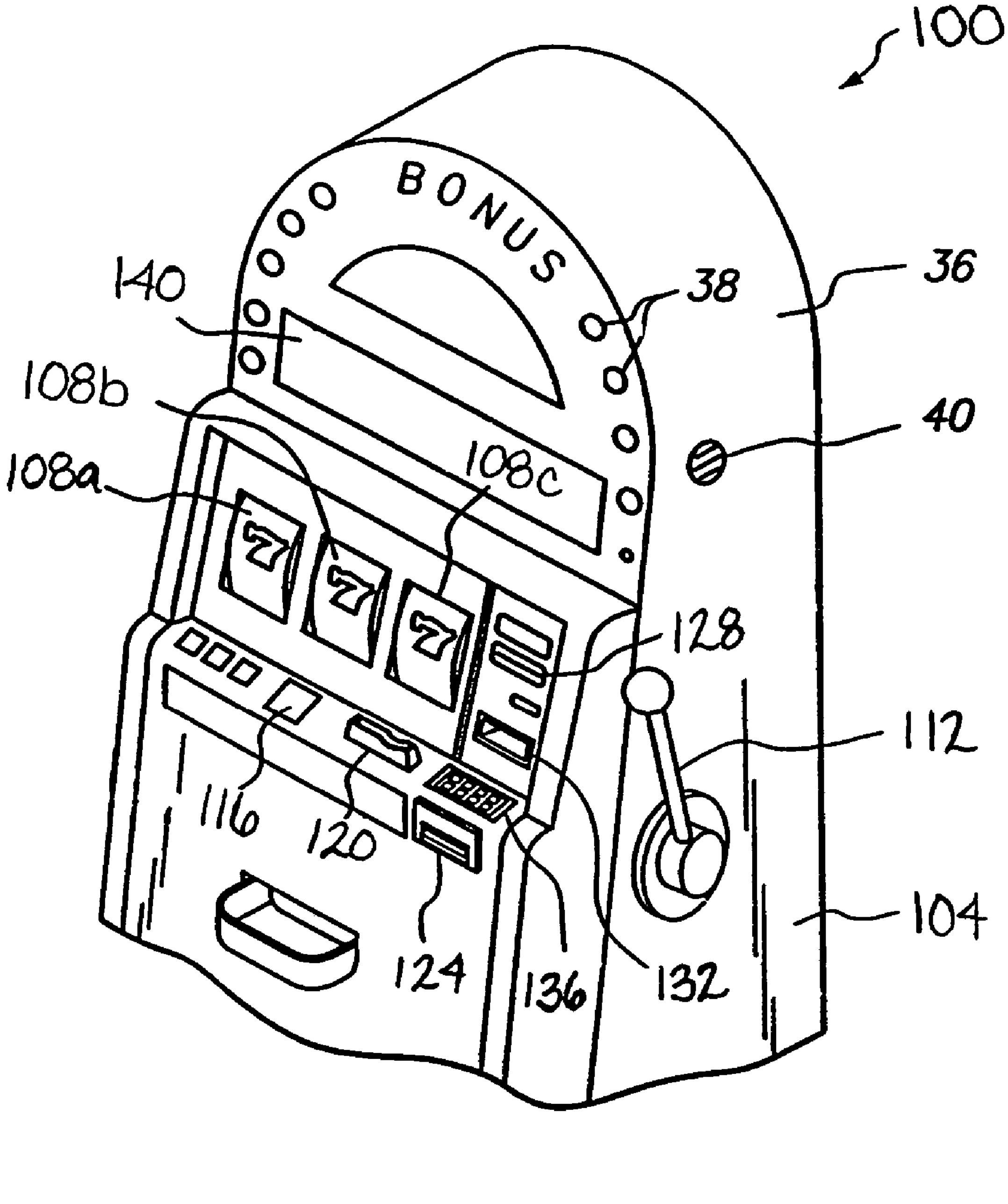
FIG. 1 is a perspective view of a the external front portion of a gaming machine.

An improved method and apparatus for creating, managing, and utilizing payout data for a gaming machine is disclosed. In one embodiment, payout data, a corresponding interpreter program, or both are stored in media that is easily accessible and easily modifiable to provide a more effective and improved method of establishing or varying the payouts of a game in a gaming machine. In one embodiment the payout data comprises high level language software code. In one embodiment the payout data is stored on a mass media. The term mass media is defined herein to mean any media other than a PROM media capable of storing the payout data that is replaced or re-writeable. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In one exemplary apparatus and method of operation, payout data or a representation of the payout statistics based on outcomes is written and stored within a gaming machine on a fixed or removable media using a "high level language". It is termed a "high level language" because it is written in a language that is readable or understandable by an individual as opposed to a "low level language". "High level" computer languages are considered similar to human languages allowing one to read, write, and edit the computer code easily. In contrast, examples of "low level languages" include assembly and machine languages which are written in binary code that is not easily editable. In one embodiment payout data or high level language may be edited using a text editing software program.

Traditionally, a compiler program is used to convert a high level language program into a low level language program (often termed object code or machine language or assembly language) that is more easily processed by a microprocessor. It is this low level binary code, written in hardware memory, that is executed by the microprocessor within a gaming machine. Hence, by converting the high level language program into object code that is in the form of binary digits, the speed of execution of the computer program is enhanced.

However, this difference in execution speed may be minimized with the use of high performance microprocessors. In one embodiment, it is contemplated that a high level language payout data is processed using an interpreter program that executes on a processor. In one embodiment the interpreter program processing comprises manipulation of the payout data, which may be configured as a high level language, into a format usable by a processor. The payout data may be stored in any convenient storage media and is interpreted for use by the processor when required. The process makes changing payouts for outcomes less complex as newly added payout data does not need to be recompiled with the game code. When a payout data is not interpreted but recompiled, an associated evaluation code is required to run the information contained in the payout table. The payout table and the evaluation code have to be compiled together. Interpreting payout data provides a method of modification of payout tables within a gaming machine without the steps of creating a new version of payout data evaluation code and recompiling with the new payout data.

As a result of the use of high level language for storage of payout data, an individual can easily read, modify, store, and execute the payout data. As a result, aspects of gaming machine payout may be achieved based on the content of the pay table or pay out program. By way of example and as a result of the invention described herein the pay tables may be easily modified. Thus, factors such as whether a fixed value or a multiplier is used for payout calculation may be controlled. Likewise, reel mappings may be readily changed as can the pattern of reel symbols that cause a payout to be changed. The payout table may also control the award of a progressive jackpot. As an advantage of the invention these factors and any other factor associated with the pay table, payout data, or payout code may be easily and readily inspected, changed, verified or replaced.

In one method and apparatus, an interpreter software program reads the payout data stored as high level language and translates that data to a form of code usable by a processor. In one embodiment, the interpreter reads the high level language payout data during every round of play of the gaming machine. In one embodiment the payout data is read only at the start of game play. The high level language payout data, may be conveniently stored in a fixed or removable media within the gaming machine. As one advantage over the prior art storage of the payout data as high level language allows the data to be easily read, modified, and saved by an individual using a data input device and a suitable display. This may be accomplished locally at the gaming machine or remotely at another computer.

Another advantage is that the pay out data may be easily submitted to a gaming control entity for review and approval without the need for compiling the payout data and the entire game software into an entire submission to the gaming control entity. This is particularly beneficial when the only changes to a game are to the payout data.

As described earlier in relation to prior art systems that use a compiler, the high level language is translated into a binary object code that is unreadable by a human. This unreadable code is subsequently "burned" or programmed into electronic hardware memory, such as a PROM (or EEPROM) that is physically installed into the gaming machine circuitry. This process undesirably involves several steps, requires the services of a skilled technician, and requires a manual removal and installation of the electronic memory device. In addition, it is contemplated that an inventory of these electronic memory devices may be required because the process involved in creating and modifying the binary code is lengthy. This may result in significant inventory cost as well as accounting cost related to part number identification and tracking. As a consequence, the method of using a high level language payout data stored in fixed or removable media in the gaming machine comprises a means to bypass these undesirable steps while providing a means to readily identify and change the payout structure of a particular game. In one configuration, changes to the pay table structure may occur during game play or when changing between games on a machine.

One or more embodiments of the method and apparatus described herein may be configured to operate in the example environment of a gaming machine. FIG. 1 illustrates one embodiment of such a gaming machine 100. In general, the gaming machine 100 is adapted to present at least one type of game for play to a player. The gaming machine 100 may be capable of providing a number of different games and/or variation of specific games in a single gaming machine. As shown, the gaming machine 100 includes a housing 104 which supports and/or houses the various components of the gaming machine 100. In the embodiment, the gaming machine 100 is adapted to present a game of "slots," and includes three rotating reels 108*a,b,c*. A handle 112 or spin button 116 is used to effectuate rotation of the reels 108*a, b, c*. During or after game play, a player may be declared a winner of the game and awarded an award if the game outcome is a predetermined combination of symbols. The illustration shown in FIG. 1 is exemplary and is one of many embodiments of a gaming machine.

In other embodiments of the gaming machine 100, the types of games simulated may include keno, blackjack, poker, and the like. In contrast to the rotating wheels 108*a, b, c*, presented in the game of slots, a video display may be used to manifest the outcome in "slots" and the other types of games. The video display may be of the tactile interactive type. It should be understood that the gaming machine 100 may be adapted to present one or more of a wide variety of games. Depending upon the game presented, the configuration of the machine may vary.

In one or more embodiments, the gaming machine 100 is adapted to present a wager-type game. In this arrangement, a player places a bet or wager in order to participate in the game. If the game's outcome is a winning outcome, then the player may be provided with an award such as coins or currency, or credits which may be redeemed for prizes or money. In one arrangement, the award may be winnings in proportion to the amount wagered or bet by the player.

In order to accept a wager, the gaming machine 100 may include a coin or token acceptor 120 for accepting the wager. The gaming machine 100 may also include a bill acceptor or validator 124 for accepting paper currency. The gaming machine 100 may be provided with other means for accepting or verifying value, such as a credit card reader 128 or a currency ticket voucher 132. The card reader 128 can be used to identify the player and provide him with visual information on the incentives or credits or points he has accumulated. This information may be displayed on a screen 140 which comprises a CRT, LCD, LED, or some other form of visual display that may include a touch screen display. A user interface 136 may comprise a touchpad or similar input device for a valued customer to input a personal identification number (PIN) or password that may provide special awards in the form of credits. The user interface 136 may also allow an employee to input a password and commands for gaming machine communication or diagnostic purposes.

Figure 2:
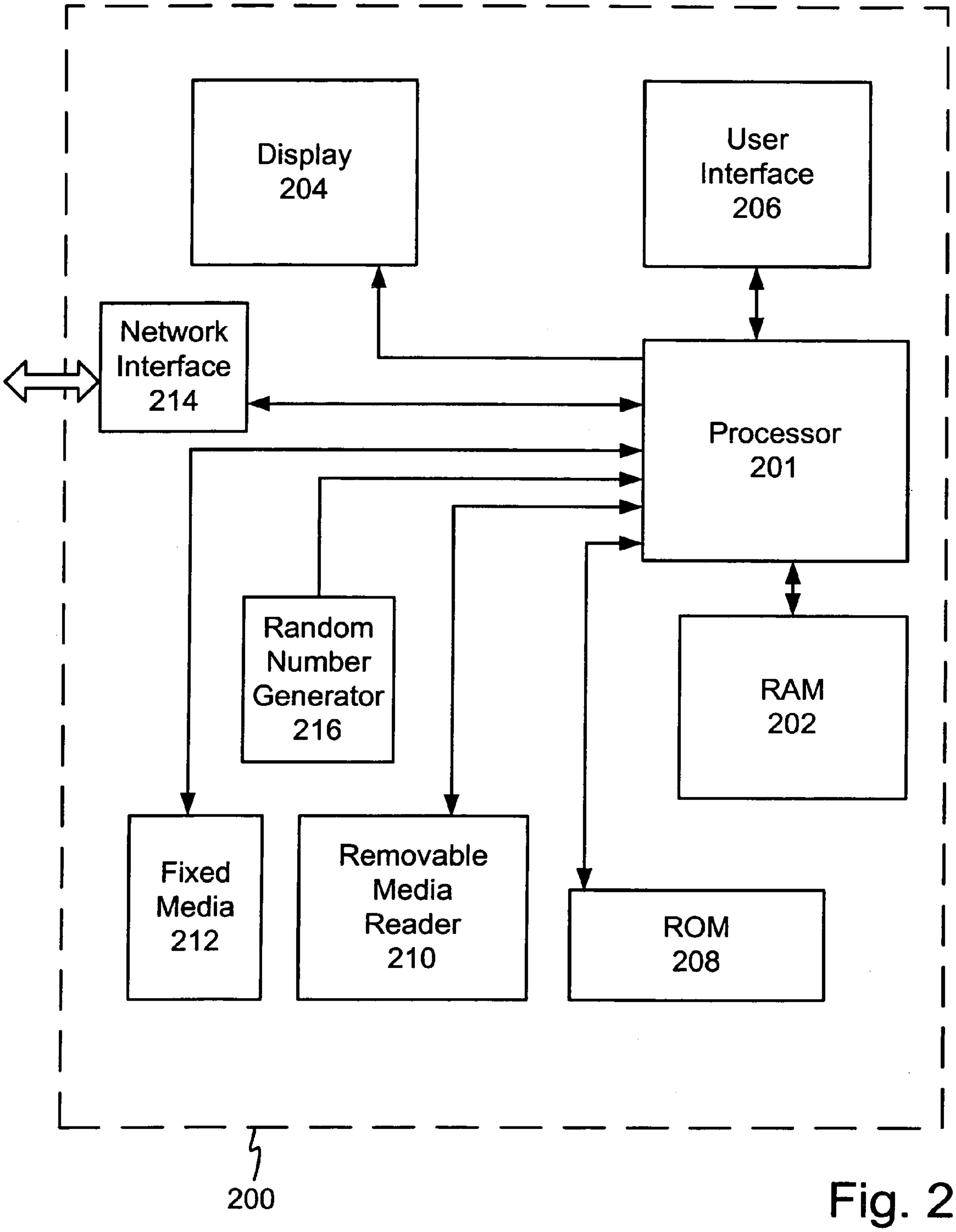
FIG. 2 illustrates a functional block diagram of a gaming machine.

FIG. 2 illustrates a functional block diagram of an example embodiment of a gaming machine 200. The components of a gaming machine 200 comprises a processor 201 that interfaces with a number of electrical elements such as a random access memory (RAM) 202 a display 204, a user interface 206, a read only memory (ROM) 208, a removable media reader 210, a fixed media 212, a network interface 214, and a random number generator 216.

As shown in FIG. 2, the network interface 214 connects to the processor 201. The processor 201 may comprise one or more microprocessor(s) such as an exemplary Intel Pentium IV, an AMD Athlon, or the like. The network interface 214 may provide a connection to an external source of data such as a host that may contain a payout data. The network interface 214 may be a device that has any number of pinouts or connector configurations and may be capable of communicating in any number of protocols. In one embodiment, the network interface 214 may comprise a wireless interface, allowing data communication to occur without a hardwired connection.

The RAM 202 connects to the processor 201 and functions to provide immediate access to dynamic computational data that may be used in the processing and generation of gaming machine payouts. The RAM 202 may vary in density and storage size depending on the processor 201 requirements. The RAM 202 may vary in terms of packaging material and pinout configurations.

The ROM 208 connects to the processor 201 and may be used to store non-volatile data for use by the processor 201. The processor 201 may configure the electronic components of the gaming machine 200 upon power up by utilizing the data stored in the ROM 208. The ROM 208 may vary in density and storage size depending on the processor 201 requirements. The ROM 208 may vary in terms of packaging material and pinout configurations. The ROM 208 may comprise a programmable ROM (PROM) or an electrically erasable programmable ROM (EEPROM).

The user interface 206 connects to the processor 201 and may comprise a keypad, keyboard, card reader, touch screen, buttons, or other interface capable of acting as an input device to the processor 201. In one embodiment and method of operation, the player may input a personal identification number (PIN) using the user interface 206 to activate a particular bonus payout function, credit, or any type of award in addition to what is normally provided to the general public. The user interface 206 may comprise a card reader and 10 digit keypad configured to allow a player to slide in a player's card and enter a PIN to activate a bonus. The casino owner may provide such bonus incentives for its most valued players. In another method of operation, the user interface 206 may be used to input a security code for use by a gaming machine technician in order to access the internal hardware of the gaming machine 200. The user interface 206 may function as a signaling tool to the processor 201 to initiate the execution, inspection or loading of software, such as a high level language payout code or an interpreter program from a source external to the gaming machine 200. In one embodiment the user interface 206 is used to access payout data on the gaming machine.

The display 204 connects to the processor 201 and provides visual information to the player or gaming machine technician. The display 204 may comprise a CRT, a monitor, or any other device capable of providing visual or graphic information to an individual. The display may be capable of touch screen operation.

The fixed media 212 connects to the processor 201 and may comprise a fixed hard drive, a redundant array of independent disks (RAID), or any fixed device or system capable of storing data such as payout data. The fixed media 212 may be used as a storage device for a high level language software or an interpreter software program that will be discussed in the following paragraphs.

The removable media reader 210 connects to the processor 201 and may comprise a removable hard drive, a removable micro-drive, a removable tape drive, CD drive, DVD drive, or any removable or portable device capable of storing data. The removable media reader 210 may be used as a reader for a media containing the high level language payout data or the interpreter software program that will be discussed in the following paragraphs. The removable media reader 210 may function in conjunction with the fixed media 212 to act as storage devices for the high level language payout data and the interpreter program.

Figure 3:
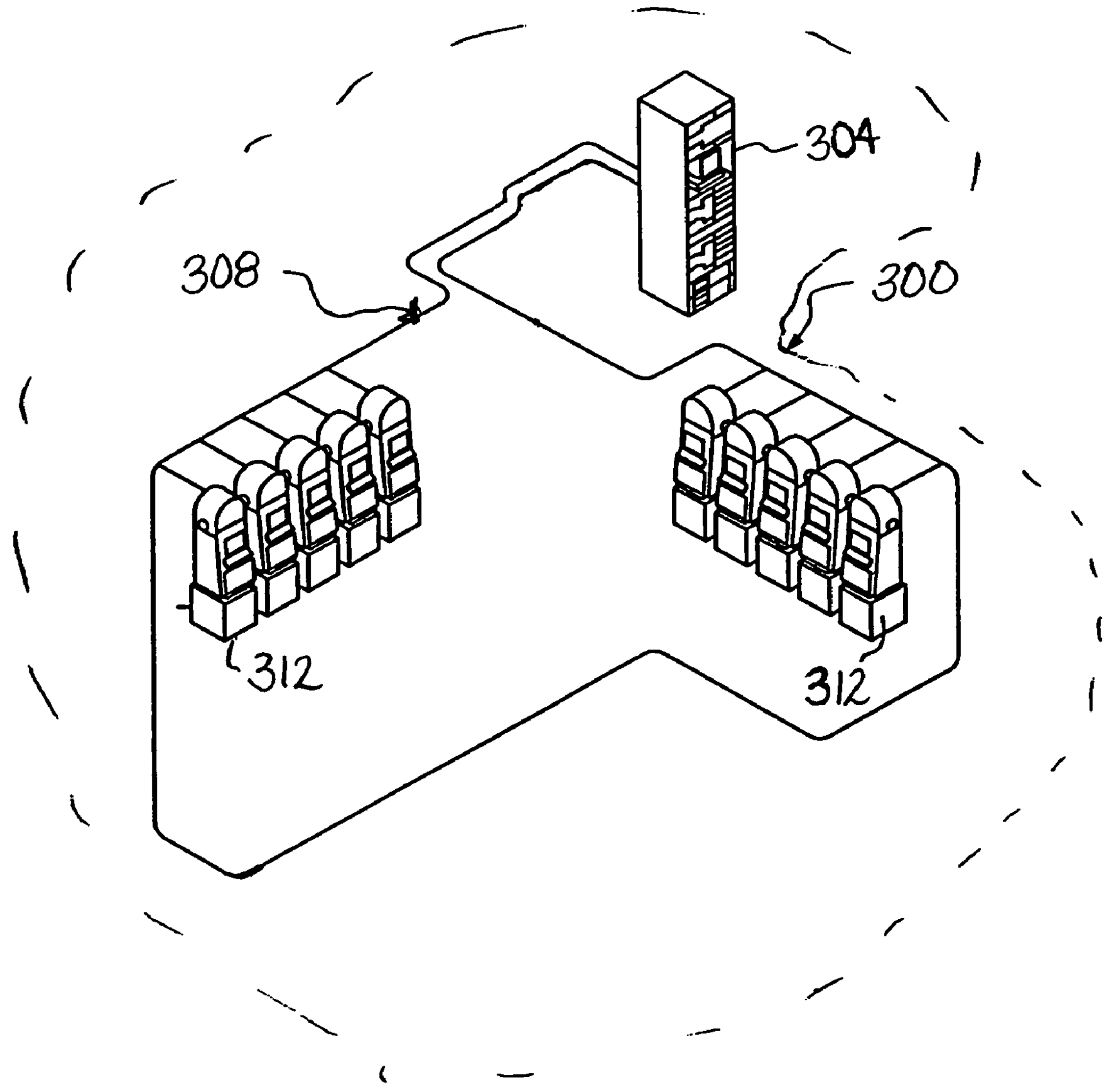
FIG. 3 illustrates an example gaming machine network.

FIG. 3 illustrates one embodiment of a gaming network 300 for managing and distributing gaming machine high level language payout data, an interpreter software program or both. The embodiment shown in FIG. 3 comprises a wired or wireless gaming network 300 (shown as a hardwired network in FIG. 3). A gaming machine software server 304 or host connects via conductors 308, to a plurality of gaming machines 312 that comprise the gaming network 300. In other embodiments, the gaming network 300 as mentioned, may include a number of gaming machine software servers 304. It is contemplated that the software server 304 may include an input device such as a keyboard and a display such as a monitor. The software server 304 may comprise a variety of devices. In one embodiment, the software server 304 comprises a computing device such as a computer having at least one microprocessor, at least one memory device, a communication interface controller, and at least one communication interface. The memory device may comprise a mass storage device for storing large amounts of data, such as an array of hard drives or disks. The software server(s) 304 may act upon commands initiated by an individual at the keyboard, to download high level language payout data or an interpreter software program to one or more gaming machines 312 over the conductors 308 or wirelessly. It is contemplated that the software server 304 may reside in close proximity to the gaming machine(s) 312, or be located remotely in a location distant from the gaming machine(s) 312. When the software server 304 is located remotely, data communication to the gaming machine 312 may occur through application of a secured communication channel. It is contemplated this connection may comprise any type network including dedicated private line, frame relay, asynchronous transfer mode, Ethernet, wireless, Internet type of connection or a variant or combination of these connections.

It is to be understood that this is one of many possible configurations that may comprise a system to manage the access and download of the gaming machine payout data or the interpreter software program. As contemplated by the gaming network 300 shown in FIG. 3, the software server 304 may be used as a convenient repository to store the high level language payout data or interpreter program for download into the gaming machine via conductors 308. It is contemplated that the software server 304 may provide other types of gaming machine data significant to the operation and functioning of the gaming machine 312.

To generate the appropriate payouts in the gaming machine, the high level language payout table and its interpreter program may be loaded into the gaming machine. There are a number of methods of transferring the payout data and its interpreter to the gaming machine controller 200.

As mentioned earlier in the discussion of FIG. 3, the payout table may be provided to the gaming machine through a network. In one exemplary method, an employee may input a security code at a user interface allowing him to access a library or collection of different payout data. An interpreter program may be associated with different payout data or be configured to operate universally. The employee may then input a specific command at the user interface designating the appropriate payout data or interpreter program to be downloaded into the fixed media 212. It is contemplated that numerous sets of payout data may be downloaded in the case where the gaming machine is configured to play a number of different games. The transfer may occur over the conductors 308 of the gaming network 300. When the download is complete, the gaming machine may perform a verification or authentication check to assure that the correct software has been downloaded. Thereafter, it is contemplated that in one embodiment a diagnostic test may be performed utilizing the downloaded software to assure that the interpreter program is working correctly with the associated high level payout table. It is contemplated that upon completion of the verification or authentication, a confirmation or an error message may be displayed on a display of the gaming machine for the employee to read.

Another method of transferring the payout table and its interpreter may be accomplished by commands entered at a keyboard or some other input device associated with the software server 304 of FIG. 3. The keyboard or input device may be located in close proximity to the software server 304 or be located remotely. In one configuration, an employee located at to the software server 304 in a secure room, for example, would input the appropriate commands via keyboard to ensure a successful download to the gaming machine. After the download is complete, the gaming machine may provide a message or a prompt to the software server 304 for display to the employee.

The aforementioned methods of transferring payout data obviate the need for a technician to physically perform a swap of payout data resident in a PROM. This may provide the benefit of improving a casino's revenue by reducing gaming machine downtime, maintaining an attractive playing environment, and reducing expenses associated with servicing gaming machines. It is further contemplated that the risk of damaging adjacent electronic devices that often occurs during such servicing is minimized, resulting in increased profit margins for the casino owner.

Another method of loading the payout data or an associated interpreter onto a gaming machine is by using a removable media reader 210 as described earlier in FIG. 2. In this method, the removable media can be updated or modified at a preferred location using a computing device such as a computer containing a similar removable media reader and stored in a repository within a secure location. It is contemplated the removable media has a size that is conveniently transportable from the storage location to the gaming machine. Exemplary media may comprise a CD, DVD, flash memory, disk or tape media, or any other type of media. It is contemplated that the gaming machine employee can easily remove and insert the removable media into the reader 210. Once this is performed, the new or revised payout data and associated interpreter is capable of being utilized by the gaming machine.

Another method of downloading the payout data into a gaming machine may comprise the use of portable devices. Computing devices such as laptops, handhelds, PDAs, and the like may connect to the gaming device either through hardwired or wireless connections. It is contemplated that these portable devices will contain storage media with the capability of storing a plurality of payout data for different games.

In another embodiment, the payout data may be uploaded to the gaming machine from a remote distant location. In this example, the software is stored in a centralized repository at some remote location where the latest updates can be downloaded over some communication system. It is contemplated that the communication may be occur over securitized networks such as over the Internet, a public switched telephone network, a dedicated private line, or some other communication network capable of transmitting the desired data.

FIG. 4 illustrates an exemplary payout data configured in table form for use in a game of slots. Although the payout table 400 shown for use with slots, it is contemplated that the principles discussed herein may apply to any game. The information contained in FIG. 4 may be coded into a high level language payout code to be executed by a processor or stored as a data file, as shown. In one embodiment an interpreter program utilizes the payout data in the table. In one embodiment the data is stored in three columns as shown. The first column 404 represents a random number that is provided by a random number generator or other source. In the example represented in FIG. 4, the random number generator, located within the gaming machine, electronically generates a random whole number. In one embodiment the range is between 1 and 1000 where each number from 1 to 1000 corresponds to a specific outcome of a gaming event. This is just one embodiment of the set of random numbers and the range from 1 to 1000 is provided for the purposes of discussion. In other games, the range of random numbers may vary depending on the needs of the particular game.

The second column 408 represents a set of various outcomes corresponding to the set of possible random numbers. In the exemplary payout table shown in FIG. 4, the possible outcomes are permutations of the symbols in the set consisting of {7R, 7W, 7B, Ch, DB, TR, 1B, 2B, 3B, –} where 7R=Red Seven, 7W=White Seven, 7B=Blue Seven, Ch=cherry, DB=double wild, TR=triple wild, 1B=one bar, 2B=two bars, 3B=three bars, and –=blank. The possible outcomes illustrated are only some of many possible outcomes and are based on the type of game configured and on the range of random numbers generated by the random number generator.

The third column 412 represents the payouts corresponding to a specific outcome, where BET=amount bet or wagered prior to a round of play or some other factor. The payouts may be described using a multiplier that is multiplied by the amount wagered prior to a round of play. In the exemplary payout table of FIG. 4, there are 1000 payout multipliers based on the number of different outcomes. For example, if a number 3 shown at row 420, is generated by the random number generator, the outcome corresponds to the outcome sequence (TR, DB, TR). This outcome maps into a payout of BET ×18,000. Therefore, if the player wagered $1.00, the payout would be $18,000.00 for this outcome. It should be noted that the payouts may be based on a multiple of the bet wagered. The payouts shown are exemplary, and it is contemplated that any payout desired by the gaming machine operator may be applied to the outcomes of the payout table, such as a fixed payout associated with a progressive jackpot when a particular outcome sequence is realized.

As an advantage of storing the payout data in the format shown in FIG. 4, the data may be easily viewed or edited. It is also contemplated that since stores as a data file or an readable and writeable media, instead of in a PROM, the payout data may be easily replaced with different payout data. This may occur by replacing the payout data file on the storage media. It should be noted that this is but one possible structure for storing the payout data. Other storage structures or data arrays may be adopted without departing from the scope of the claims that follow.

In an alternative embodiment, high level language version of payout data may be embodied as a software program is included in an Appendix that follows the specification.

In an embodiment having the payout data configured or assembled into software code, the payout data may be integral with software code, As a result, the software code may be executed to determine a payout. Although stored in software code form, the payout data is easily understood or change(d). Moreover, the entire file storing the payout software code may be easily replaced. Additional software compilers or other software may be included on the gaming machine to manipulate the payout software code into a format that is useable by a processor. In one embodiment the payout software code is written in a C++ programming language. As can be seen, the high level language used in writing the software program allows one to easily understand the content.

Figure 5:
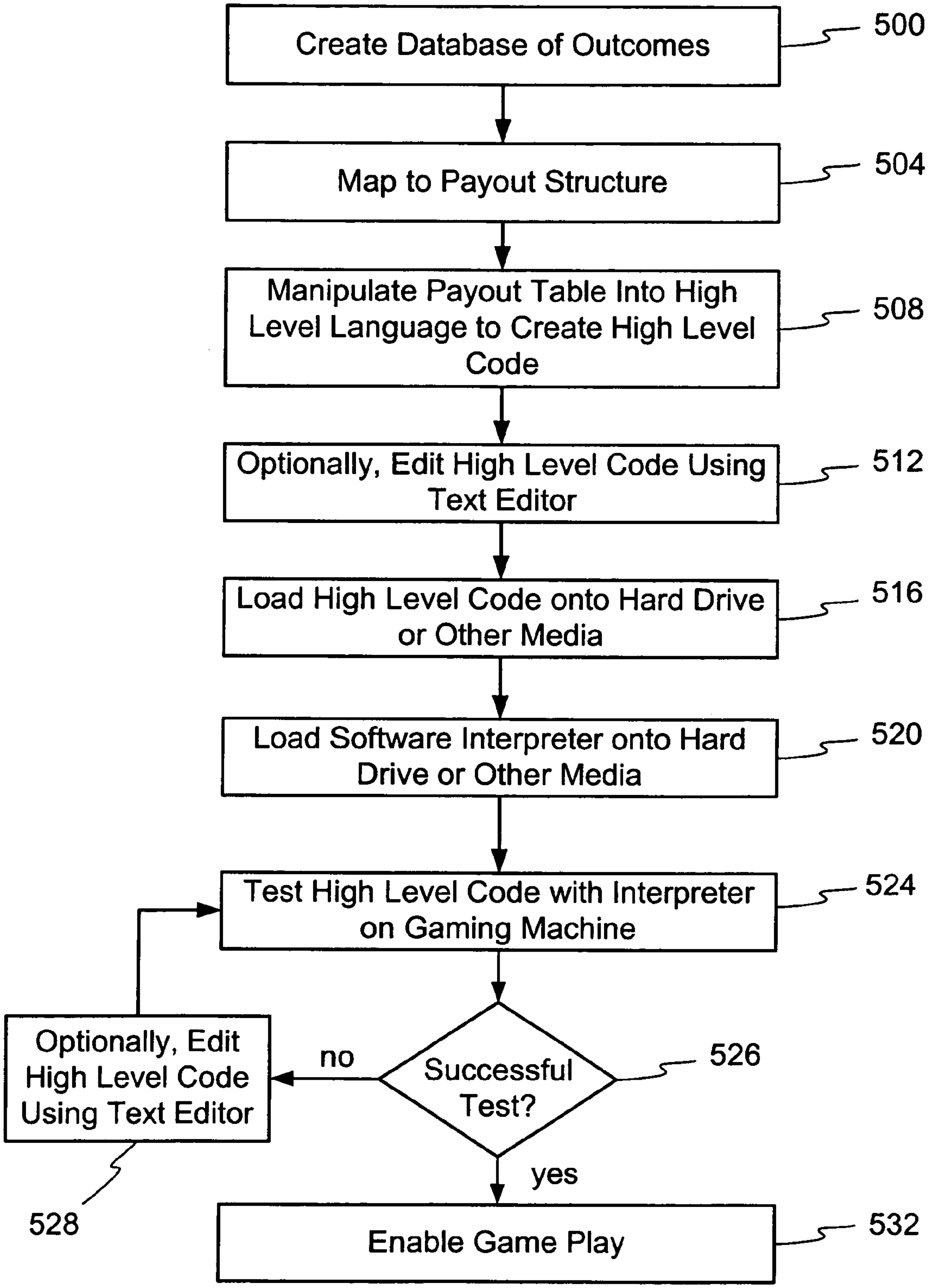
FIG. 5 illustrates an operational flow diagram of an example method for downloading a payout data into a gaming machine.

FIG. 5 illustrates an operational flow diagram of an exemplary method for downloading of payout data into a gaming machine. A first step 500 involves creating a database of possible outcomes for a particular game. The outcomes represent the sample space of all possible events that might occur in a round of play of a particular game. In one embodiment, an outcome is generated randomly by way of a random number generator. The outcomes are then mapped to a payout structure as represented at a step 504. An exemplary set of outcomes and payout structures for a game of slots is illustrated in FIG. 4. At a step 508, the programer or other individual manipulates the payout data using a software or text editor into a high level language to create a high level code. In another embodiment the payout data is arranged in a table or other data file format.

Thereafter at a step 512, one may optionally edit the high level code using an editor. Next at a step 516, the process loads the high level code onto a hard drive or other media located in the gaming machine or a location accessible from the gaming machine. At a step 520 an associated software interpreter may be optionally loaded onto the hard drive or other media located in the gaming machine or location accessible by the gaming machine. The interpreter translates the high level code (containing payout statistics) into functional commands that are recognized by the processor. Validating a successful modification of the payout data may comprise running a software program that simulates a round of play a predetermined number of times and includes simulation of a particular wager, generation of a random number, subsequent mapping to generate a corresponding outcome, and verification of the resulting payout. A decision is made at a step 526 based on the result of the validation. At step 526, a determination is made regarding whether the test was successful. If the test was not successful then the process advances to a step 528. Should an error message appear, a software editor may be used in conjunction with an input device and a display to facilitate changes in step 528. Alternatively, if a successful test verification is performed, the process advances to a step 532, to enable game play. Game play enablement may be electronically automated following completion of the validation process and allows the gaming machine to be fully operational.

Figure 6:
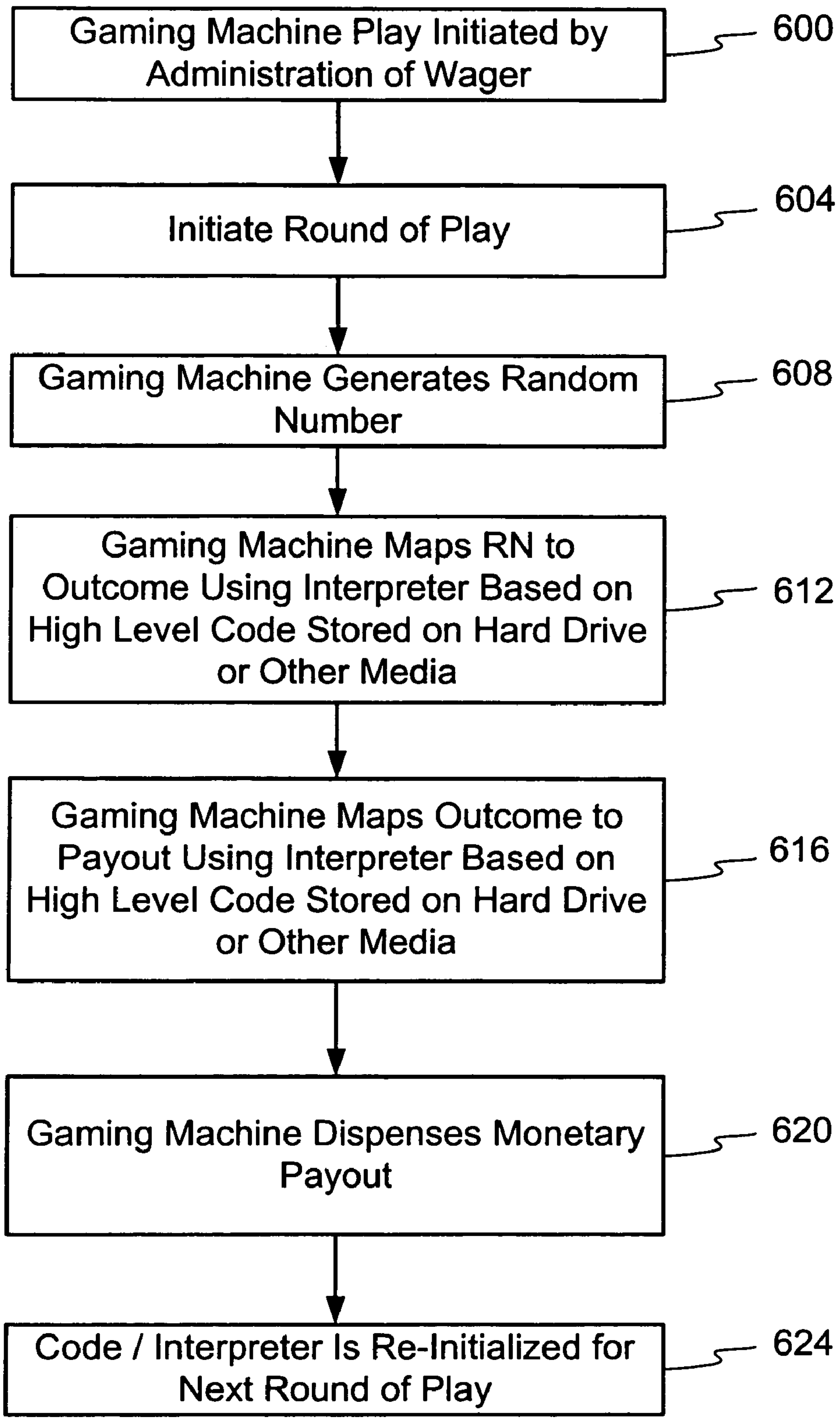
FIG. 6 illustrates an operational flow diagram of payout data utilization during gaming machine operation.

FIG. 6 illustrates an operational flow diagram of an exemplary use of payout data during operation of a gaming machine. At a step 600, a player administers a wager to a gaming machine configured to provide a wagering event. Next at step 604, a round of play is initiated. In one embodiment, the gaming machine generates a random number (RN) using a random number generator as shown at a step 608. At step 612, the gaming machine maps the RN to a specific outcome through the process described earlier in conjunction with FIG. 4 or through execution of software code. Thereafter, the gaming machine may map the outcome of the RN to a specified payout as indicated in step 616. In one embodiment software code may execute to perform the mapping. For example, steps 612 and 616 may employ the use of an interpreter program as described earlier to interpret high level payout data configured as software code into a format usable by a processor. At a step 620, the gaming machine may dispense a monetary payout based on the payout indicated by payout data, such as illustrated in the table shown in FIG. 4. Alternatively, credits or other forms of reward may be provided. At a step 624, the interpreter and high level language payout table software may be re-initialized for the next round of play.

It will be understood that the above described arrangements of apparatus and the methods derived therefrom are merely illustrative of applications of the principles of this invention and many other embodiments and modifications may be made without departing from the spirit and scope of the invention as defined in the claims.

What is claimed is:

1. A method comprising:

providing access to first payout data stored in a non-executable format that is not usable to a game code, the first payout data stored in a memory of a gaming machine;

displaying the first payout data;

receiving a portable storage device at an interface of the gaming machine, the portable storage device storing a modification of the first payout data, the portable storage device capable of being carried to the gaming machine and placed in communication with the interface;

receiving the modification of the first payout data via the interface from the portable storage device when the portable storage device is in communication with the interface;

generating second payout data upon receiving the modification;

converting the non-executable format into an executable format of the second payout data;

receiving an indication to provide an instance of a wagering game;

generating a random number with a random number generator;

mapping the random number to an outcome of two or more outcomes contained in the second a out data having the executable format using an interpreter program situated on a storage media at the gaming machine;

mapping the outcome to a payout; and providing the payout.

2. The method of claim 1, wherein the generating and the mapping are performed by a processor.

3. An apparatus, comprising:

means for providing access to first payout data stored in a non-executable format that is not usable to a game code, the first payout data stored in a memory of a gaming machine;

means for displaying the first payout data;

interface means for receiving a portable storage device storing a modification of the first payout data, the portable storage device capable of being carried to the gaming machine and placed in communication with the interface means, the interface means capable of receiving the modification of the first payout data from the portable storage device when the portable storage device is in communication with the interface means;

means for generating second payout data upon receiving the modification;

means for converting the non-executable format into an executable format of the second payout data;

means for receiving an indication to provide an instance of a wagering game;

means for generating a random number;

means for mapping the random number to an outcome of two or more outcomes contained in the second payout data having the executable format using an interpreter program situated on a storage media at the gaming machine;

means for mapping the outcome to a payout; and means for providing the payout.

4. The apparatus of claim 3, wherein the generating means and the mapping means comprise at least one processor.

5. The apparatus of claim 3, wherein the mapping means comprises the interpreter program.

6. A wager gaming machine, comprising:

a display;

apparatus for indicating payouts to a player;

an interface system adapted to receive a portable storage device storing a modification of first payout data, the portable storage device capable of being carried to the gaming machine and placed in communication with the interface system;

a central processing unit; and a memory having a game code configured for execution by the central processing unit stored therein, the memory also having the first payout data stored therein, the first payout data being stored in a non-executable format that is not usable by the game code, wherein the central processing unit is configured to do the following:

provide access, via at least one of the display or the interface system, to the first payout data;

display the first payout data on the display;

receive, via the interface system, the modification of the first payout data from the portable storage device when the portable storage device is in communication with the interface system;

generate second payout data upon receiving the modification;

convert the non-executable format into an executable format of the second payout data;

receive, via at least one of the display or the interface system, an indication to provide an instance of a wagering game;

generate a random number;

map the random number to an outcome of two or more outcomes contained in the second payout data having the executable format using an interpreter program situated on a storage media at the gaming machine;

map the outcome to a payout; and indicate the payout via the apparatus for indicating payouts.

7. The wager gaming machine of claim 6, wherein the interface system comprises a network interface, and wherein the central processing unit is further configured to provide the access to the first payout data via the network interface.

8. The wager gaming machine of claim 6, the central processing unit being further configured to execute the interpreter program to perform the mapping.

9. The wager gaming machine of claim 8, the interpreter program stored on the portable storage device, the interpreter program being received, via the interface system, from the portable storage device when the portable storage device is in communication with the interface system.

* * * * *